(12) United States Patent
Rawat et al.

(10) Patent No.: US 11,568,249 B2
(45) Date of Patent: Jan. 31, 2023

(54) AUTOMATED DECISION MAKING FOR NEURAL ARCHITECTURE SEARCH

(71) Applicant: INTERNATIONAL BUSINESS MACHINES CORPORATION, Armonk, NY (US)

(72) Inventors: Ambrish Rawat, Dublin (IE); Martin Wistuba, Dublin (IE); Beat Buesser, Ashtown (IE); Mathieu Sinn, Dublin (IE); Sharon Qian, Somerville, MA (US); Suwen Lin, Mishawaka, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

(21) Appl. No.: 16/842,113

(22) Filed: Apr. 7, 2020

(65) Prior Publication Data

US 2021/0312276 A1 Oct. 7, 2021

(51) Int. Cl.
*G06N 3/08* (2006.01)
*G06K 9/62* (2022.01)
*G06N 20/00* (2019.01)

(52) U.S. Cl.
CPC .............. *G06N 3/08* (2013.01); *G06K 9/6227* (2013.01); *G06N 20/00* (2019.01)

(58) Field of Classification Search
CPC ......... G06N 3/08; G06N 20/00; G06K 9/6227
USPC .................................. 706/25, 15, 16, 12, 21
See application file for complete search history.

(56) References Cited

U.S. PATENT DOCUMENTS

| | | |
|---|---|---|
| 9,959,498 B1 | 5/2018 | Narayanaswami et al. |
| 10,133,275 B1 | 11/2018 | Kobilarov et al. |
| 10,268,947 B2 | 4/2019 | Wang et al. |
| 2002/0174079 A1 | 11/2002 | Mathias et al. |
| 2019/0026639 A1 | 1/2019 | Vasudevan et al. |
| 2019/0101919 A1 | 4/2019 | Kobilarov et al. |
| 2020/0104687 A1* | 4/2020 | Gesmundo ........... G06N 3/0472 |
| 2021/0056378 A1* | 2/2021 | Yang ...................... G06N 3/063 |
| 2021/0201107 A1* | 7/2021 | Laszlo .................. G06N 3/0454 |

OTHER PUBLICATIONS

IPCOM000252104D; "Anticipatory Product Development Using Design Suggestions" IPCOM publication Date Dec. 15, 2017, (34 Pages).
IPCOM000252354D; "Configuring an Application Based on Settings in Similar Applications"; IPCOM Publication Date Jan. 5, 2018; (36 Pages).
IPCOM000251863D; "API for Learning and Predicting User Interactions"; IPCOM Publication Date Dec. 7, 2017; (9 Pages).

(Continued)

*Primary Examiner* — Thjuan K Addy
(74) *Attorney, Agent, or Firm* — Griffiths & Seaton PLLC

(57) ABSTRACT

Various embodiments are provided for automating decision making for a neural architecture search by one or more processors in a computing system. One or more specifications may be automatically selected for a dataset, tasks, and one or more constraints for a neural architecture search. The neural architecture search may be performed based on the one or more specifications. A deep learning model may be suggested, predicted, and/or configured for the dataset, the tasks, and the one or more constraints based on the neural architecture search.

20 Claims, 11 Drawing Sheets

(56) References Cited

OTHER PUBLICATIONS

IPCOM000252091D; "Machine Learning to Predict Advertisement Targeting Solutions"; IPCOM Publication Date Dec. 15, 2017; (35 Pages).
Pham, H. et al.; "Efficient Neural Architecture Search Via Parameter Sharing"; arXiv:1802.03268v2 [cs,LG] Feb. 12, 2018; (11 Pages).
Jin, H. et al.; "Auto-Keras: an Efficient Neural Architecture Search System"; arXiv:1806.10282v3 [cs. LG] Mar. 26, 2019; (11 Pages).
Lu, J. et al.; "Deep Reinforcement Learning for Computer Vision"; (163 Pages).
"Inductive Transfer for Neural Architecture Optimization" Mar. 8, 2019 (arxiv 1903.03536) (13 Pages).
"Bayesian Meta-network Architecture Learning" Shaw et al. (arxiv 1812.09584) Third workshop on Bayesian Deep Learning (NeurIPS 2018), Montréal, Canada. (7 Pages).
"TAPAS: Train-less Accuracy Predictor for Architecture Search" R. Istrate et al. Jun. 1, 2018 (arxiv 1806.00250) (9 Pages).
"Transfer Learning with Neural AutoML" Wong et al. Jan. 28, 2019 (arxiv 1803.02780) (17 Pages).
"Transferable AutoML by Model Sharing over Grouped Datasets" Xue et al. (CVPR 2019) (10 Pages).

\* cited by examiner

AUTOMATED DECISION MAKING FOR NEURAL ARCHITECTURE SEARCH

BACKGROUND OF THE INVENTION

Field of the Invention

The present invention relates in general to computing systems, and more particularly to, various embodiments for automating decision making for a neural architecture search in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for automating decision making for a neural architecture search by one or more processors in a computing system, are provided. In one embodiment, by way of example only, a method for automating decision making for a neural architecture search in a computing system, again by a processor, is provided. One or more specifications may be automatically selected for a dataset, tasks, and one or more constraints for a neural architecture search. The neural architecture search may be performed based on the one or more specifications. A deep learning model may be suggested, predicted, and/or configured for the dataset, the tasks, and the one or more constraints based on the neural architecture search.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
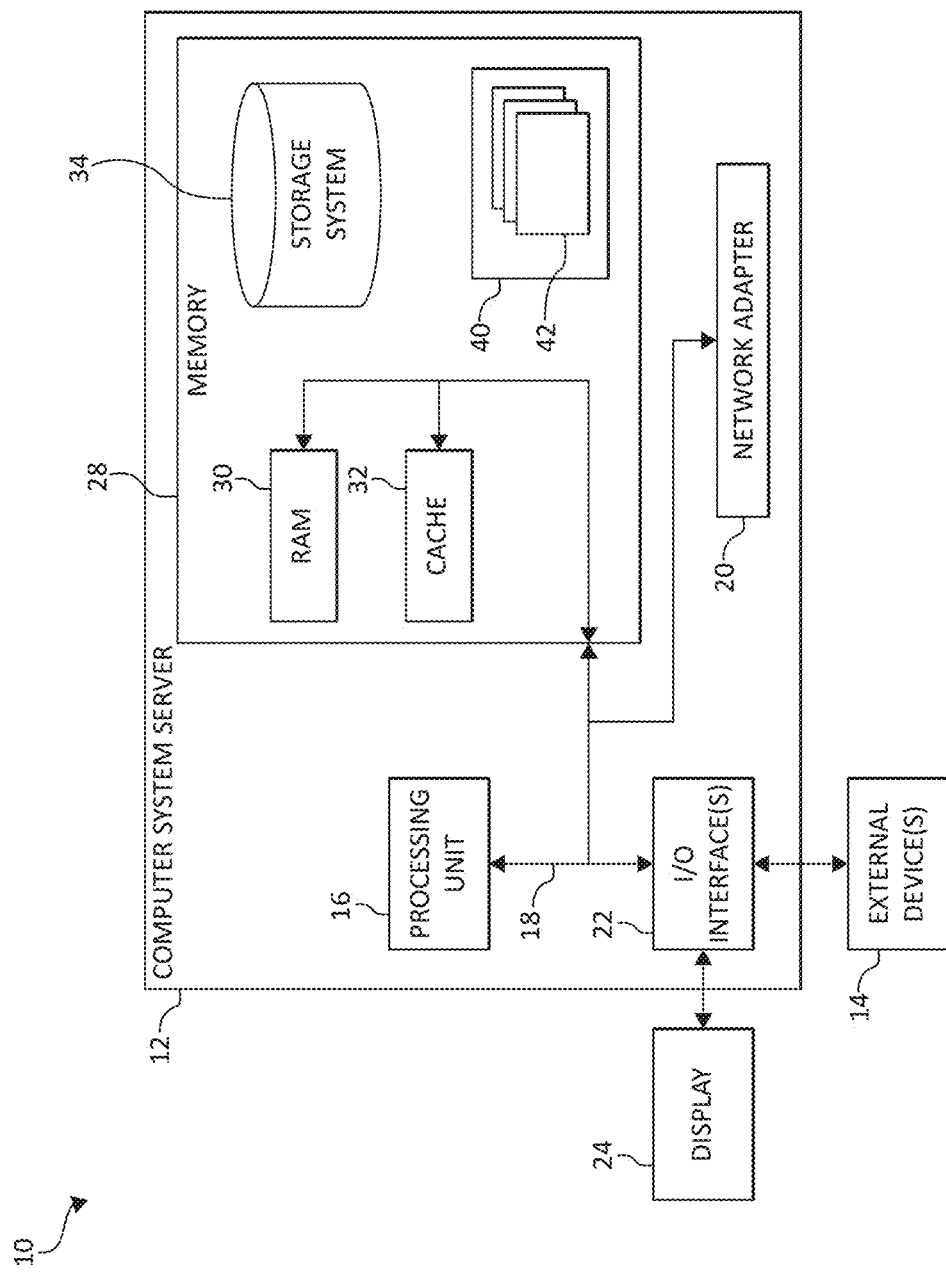
FIG. 1 is a block diagram depicting an exemplary cloud computing node according to an embodiment of the present invention.

The present invention relates generally to the field of artificial intelligence ("AI") such as, for example, machine learning and/or deep learning. Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Moreover, deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Overall, deep learning has led to major advances, including, but not limited to, progress in neural architectures. For example, automated deep learning may include automating the process of finding suitable preprocessing techniques and architecture designs along with training routines and configurations required to obtain an optimized deep learning model.

A Neural architecture search (NAS), for example, is only one component of the automation pipeline that aims to find suitable architectures for training a deep learning model, which is a computationally intensive task. That is, a NAS is an technique or operation for automating the design of an artificial neural network ("ANN") and used in machine learning. The NAS operations may be categorized according to a search space, search strategy and performance estimation strategy used such as, for example, a) the search space may define the type(s) of ANN that can be designed and optimized, b) the search strategy may define the approach used to explore the search space, and c) the performance estimation strategy may evaluate the performance of a possible ANN from its design (without constructing and training it). Thus, the NAS may be designed to find a suitable architecture for a given dataset and task (e.g., labeling images). However, a current challenge within a NAS is the challenge of dealing with various specifications and conditions that may change over a period of time. Thus, a need exists for automating the decision making for a NAS where a problem definition frequently changes.

Accordingly, in one aspect, mechanisms of the illustrated embodiments provide a novel solution to automate the decision making for a neural architecture search in a computing system. In one aspect, by way of example only, one or more specifications may be automatically selected for a dataset, tasks, and one or more constraints for a neural architecture search. The neural architecture search may be performed based on the one or more specifications. A deep learning model may be suggested, predicted, and/or configured for the dataset, the tasks, and the one or more constraints based on the neural architecture search.

In an additional aspect, by way of example only, various embodiments provide for a NAS operation designed to locate, identify, and/or suggest a suitable neural network architecture/configuration (e.g., a deep learning model) for a given dataset and task (e.g., labeling images). The present invention may process and execute one or more NAS decisions in situation where one or more of the following conditions (e.g., specifications) may change over a selected or defined time period: 1) dataset specifications including dimensions and type, 2) data distribution, 3) key performance indicators ("KPIs") and metrics for the task, 4) computational resources, 5) search budget, 6) computational resources with respect to deployment, and/or 7) a search space for the NAS.

In an additional aspect, various embodiments provide for automated decision making for neural architecture search where a problem definition changes frequently. In one aspect, a user may provide specifications for dataset, tasks and constraints. A neural architecture search may be performed for a neural architecture based upon the specifications. A neural architecture search configuration may be provided for any specification. In one aspect, an optimizer may explore a search space and locates/finds the neural architecture that maximize an objective function of the task for the dataset. A configuration of neural architecture search may be provided/suggested for a given specification. Each previous/historical neural architecture search performed may be learned and used for enhanced neural architecture searches.

In an additional aspect, the present invention automatically selects an optimal setting for a neural architecture search operation given a problem definition. The problem definition may be defined by specifying a task (e.g., classification/regression), a dataset, and a set of constraints (e.g., allowed neural architecture search time, permissible number of parameters in the deep learning model, etc.). A machine learning model may be used that takes as input one or more features that describe a specified problem and predicts the choices required for instantiating a neural architecture search operation. The machine learning model (e.g., a decision component) may be learned with a reinforcement signal obtained as a performance of the deep learning model predicted by the neural architecture search operation. Thus, the present invention may configure a NAS system for subsequently applying a DL operation where one or more machine learning model decisions pertain to aspects of NAS such as, for example, search time, number of parameters etc. A machine learning model decision component may relate to configuring a NAS and the configuration of the eventual DL model is then in turn performed by the NAS in a hierarchical order.

In one aspect, the specifications may include data set dimensions, type, and data distribution. The specifications may include one or more key performance indicators ("KPIs") and metrics for a task. The constraints may specify a computational resources and search budget. The constraints may specify computational resources with respect to deployment of a neural architecture search. The optimizer (e.g., an optimization operation) may explore a search space and finds the architecture that maximizes the objective function of the task for the dataset. A decision component may be used that suggests, provides, predicts a configuration of neural architecture search for the user provided specifications. The decision component may include a machine learning component that is learned and/or trained based on the history of searches performed.

Also, it should be noted that one or more calculations may be performed using various mathematical operations or functions that may involve one or more mathematical operations (e.g., performing rates of change/calculus operations, solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as used herein, "optimize" may refer to and/or defined as "maximize," "minimize," or attain one or more specific targets, objectives, goals, or intentions. Optimize may also refer to maximizing a benefit to a user (e.g., maximize a trained machine learning model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of preprocessing operations ("preprocessors") and/or machine learning models, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
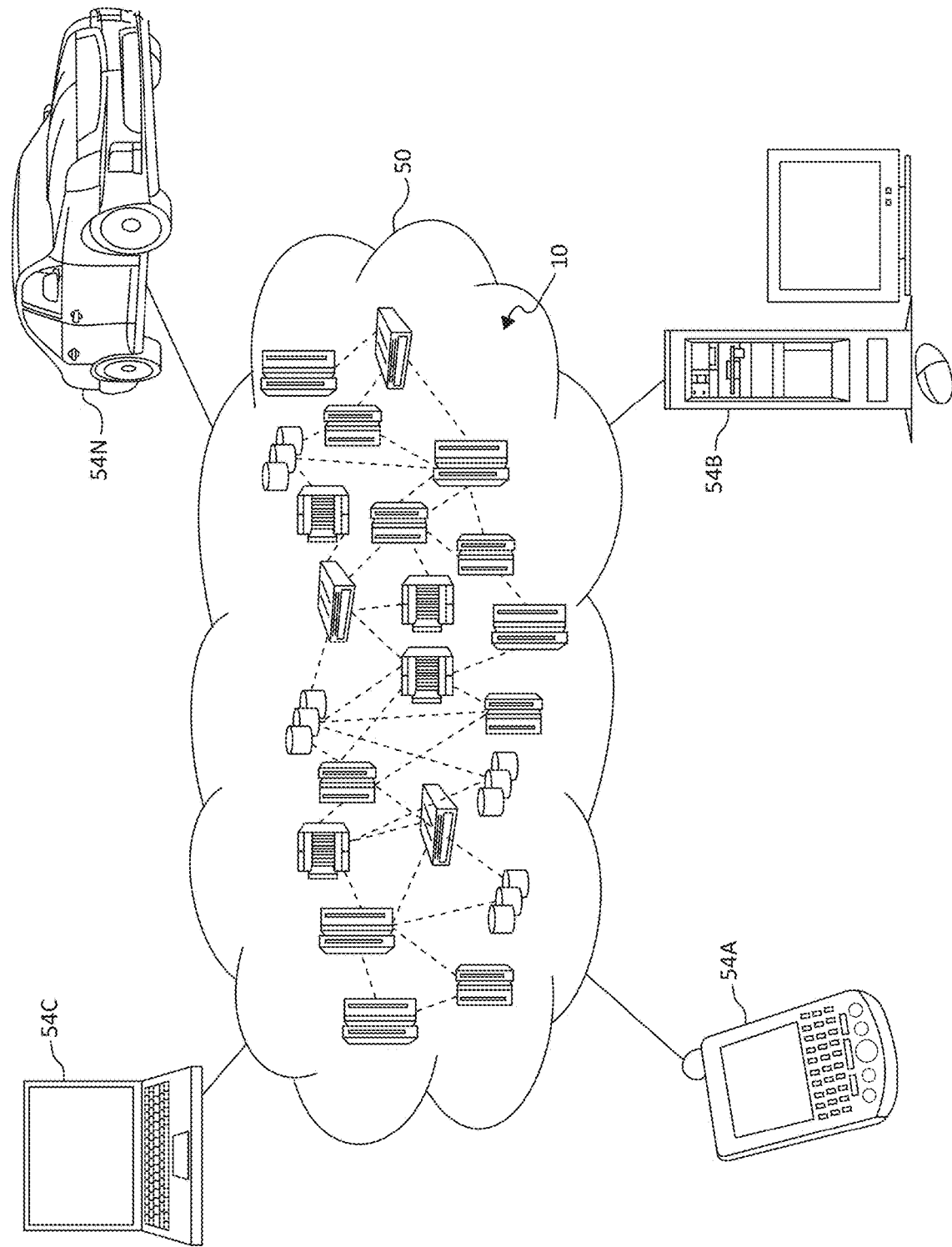
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
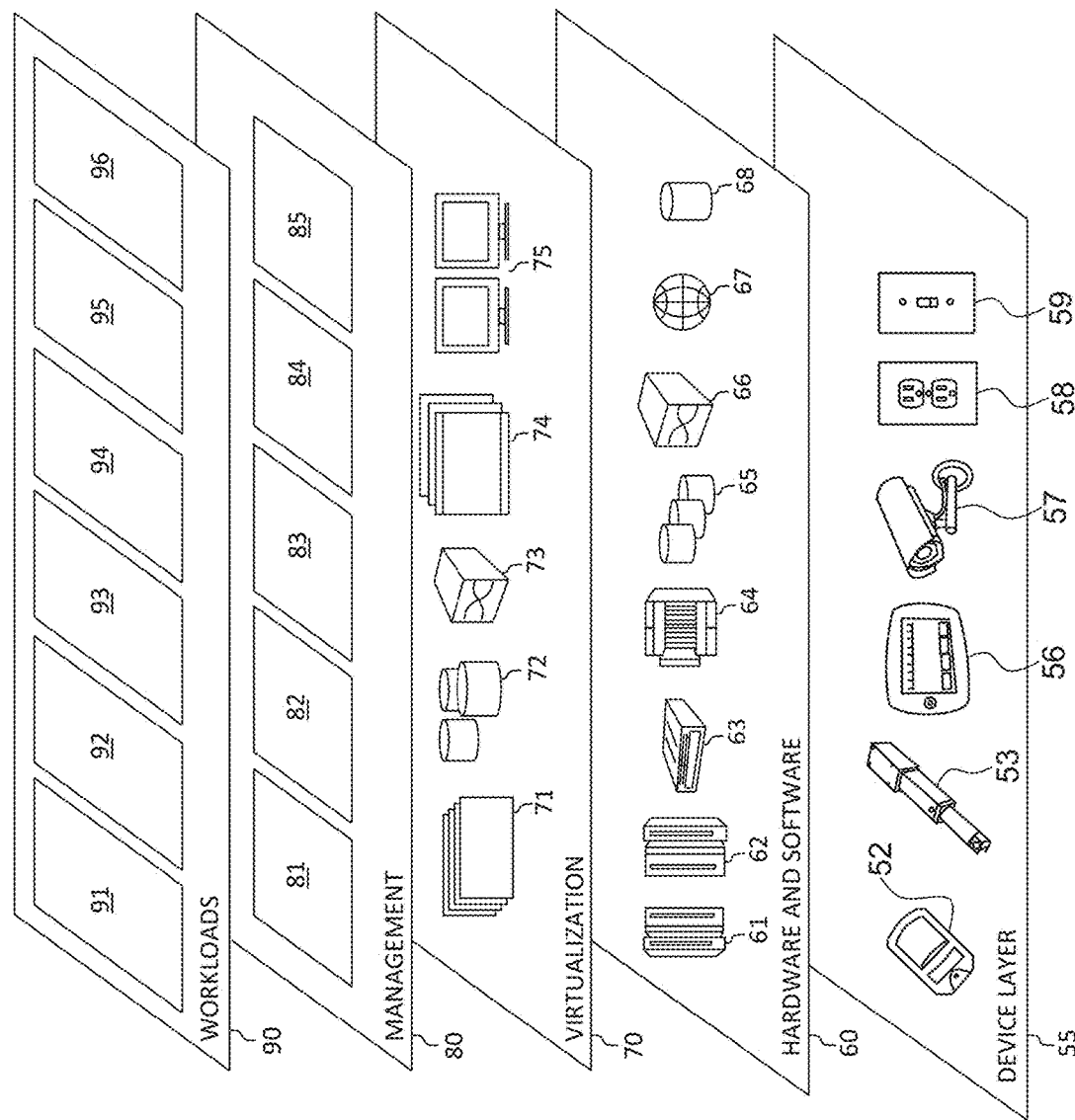
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automating decision making for a neural architecture search in a computing environment (e.g., in a neural network architecture). In addition, workloads and functions 96 for automating decision making for a neural architecture search in a computing environment may include such operations as analytics, deep learning, and as will be further described, user and device management functions. One of ordinary skill in the art will appreciate that the workloads and functions 96 for automating decision making for a neural architecture search in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing automating decision making for a neural architecture search in a computing environment in a computing system. One or more hardened machine learning models that are secured against adversarial challenges are provided by applying one or more of a plurality of combinations of selected preprocessing operations from one or more machine learning models, a data set used for hardening the one or more machine learning models, a list of preprocessors, and a selected number of learners.

Figure 4:
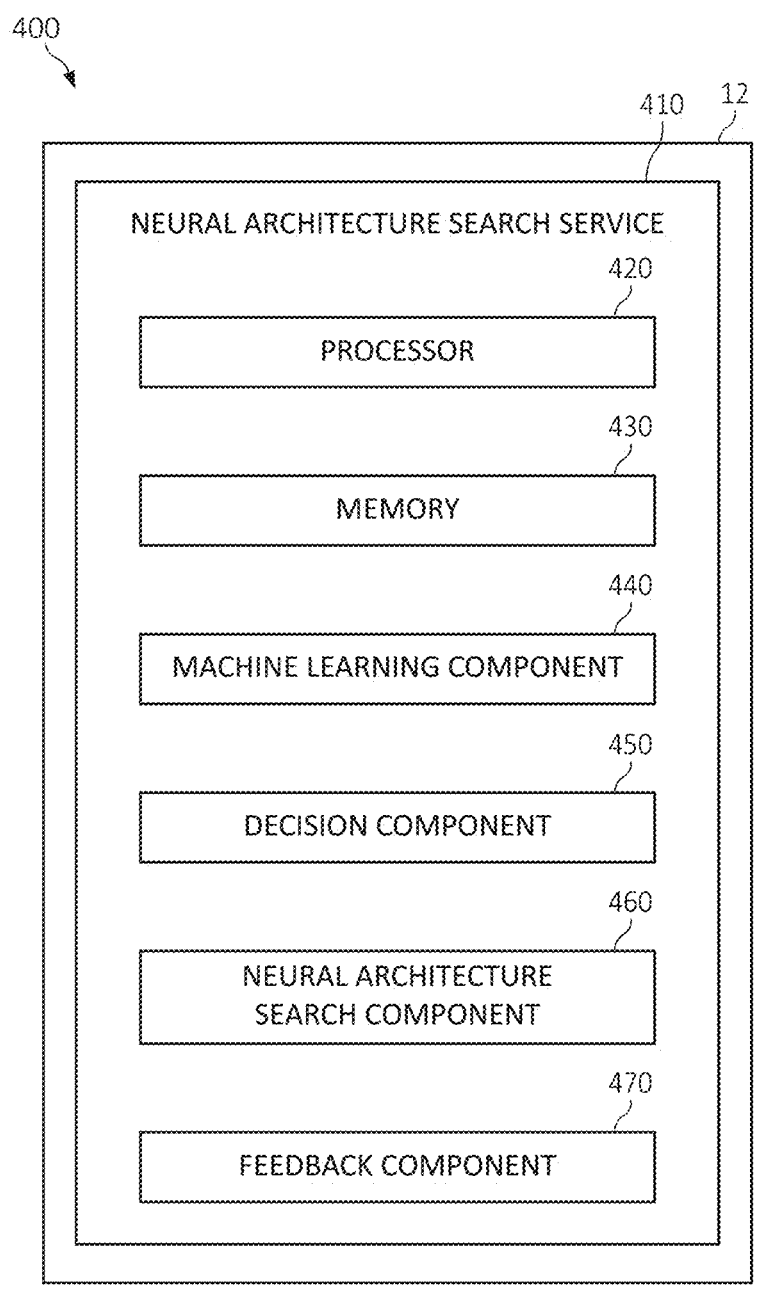
FIG. 4 is an additional block diagram depicting an exemplary functional relationship between various aspects of the present invention.

Turning now to FIG. 4, a block diagram depicting exemplary functional components of system 400 for automating decision making for a neural architecture search in a computing environment (e.g., in a neural network architecture) according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

A neural architecture search service 410 is shown, incorporating processing unit 420 ("processor") to perform various computational, data processing and other functionality in accordance with various aspects of the present invention. In one aspect, the processor 420 and memory 430 may be internal and/or external to the neural architecture search service 410, and internal and/or external to the computing system/server 12. The neural architecture search service 410 may be included and/or external to the computer system/server 12, as described in FIG. 1. The processing unit 420 may be in communication with the memory 430. The neural architecture search service 410 may include a machine learning component 440, a decision component 450, a neural architecture search component 460, and a feedback component.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In one aspect, the neural architecture search component 460, in association with the decision component 450 and machine learning component 440 if necessary, may select one or more specifications for a dataset, tasks, and one or more constraints for a neural architecture search, perform the neural architecture search based on the one or more specifications, and suggest a deep learning model for the dataset, the tasks, and the one or more constraints based on the neural architecture search.

In addition, by way of example only, the neural architecture search component 460, in association with the decision component 450 and machine learning component 440 if necessary, may learn the one or more specifications from each previous neural architecture search or even receive the one or more specifications for the dataset, the tasks, and the one or more constraints. In one aspect, the constraints may include at least an allowed neural architecture search time and a permissible number of parameters in a deep learning model.

The neural architecture search component 460, in association with the decision component 450 and machine learning component 440 if necessary, may select a search space and a selected machine learning model by the one or more constraints for the neural architecture search.

The neural architecture search component 460, in association with the decision component 450 and machine learning component 440 if necessary, may detect a change to the one or more specifications, wherein the one or more specifications include a dataset dimension, dataset type, data distribution data, key performance indicators ("KPIs") and metrics, computational resources, a search space for the neural architecture search, or a combination thereof.

The neural architecture search component 460, in association with the decision component 450 and machine learning component 440 if necessary, may recommend a modification to a previously identified deep learning model for the neural architecture search.

The neural architecture search component 460, in association with the machine learning component 440, may initiate a machine learning model to search a search space to identify the deep learning model that maximizes an objective function of each task for a dataset, and learn one or more decisions and settings relating to previous neural architecture searches for performing the neural architecture search.

The feedback component 470 may collect, store, and maintain information/feedback relating to each neural architecture search. The information/feedback may assist the decision model to select one or more settings and decisions for the neural architecture search using historical/previous information (e.g., historical settings and decisions) relating to previous neural architecture searches.

In one aspect, the machine learning component 440, as described herein, may be perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In one aspect, the neural architecture search service 410 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Thus, as illustrated in FIG. 4, the present invention provides applicability of NAS operations under various constraint, budgets, and/or changing specifications by using information relating to previous search efforts (history) and utilizes the historical neural architecture search feedback/data to improve a current neural architecture search. Thus, the present invention improves the quality of search result and saves on computational effort while automatically determining a trade-off between computational effort and quality of output for the neural architecture search.

Turning now to FIGS. 5A-5E, are block diagrams depicting exemplary an system and functionality for automating decision making for a neural architecture search in a computing environment. In one aspect, one or more of the components, modules, services, applications, and/or functions described in FIGS. 1-4 may be used in FIGS. 5A-5E. As shown, various blocks of functionality are depicted with arrows designating the blocks' of system 500 relationships with each other and to show process flow. Additionally, descriptive information is also seen relating each of the functional blocks' of system 500. As will be seen, many of the functional blocks may also be considered "modules" of functionality, in the same descriptive sense as has been previously described in FIG. 4. With the foregoing in mind, the module blocks' of system 500 may also be incorporated into various hardware and software components of a system for automating decision making for a neural architecture search in a computing environment (e.g., in a neural network architecture) in accordance with the present invention. Many of the functional blocks 500 may execute as background processes on various components, either in distributed computing components, or elsewhere.

As depicted, system 500 includes a decision module 520 (e.g., a meta-decision module 520) and a neural architecture search component 530. The neural architecture search component 530 may include an optimizer component 532 (e.g., a multiple optimizer) and a search space component 534 (e.g., for searching multiple search spaces).

Figure 5A:
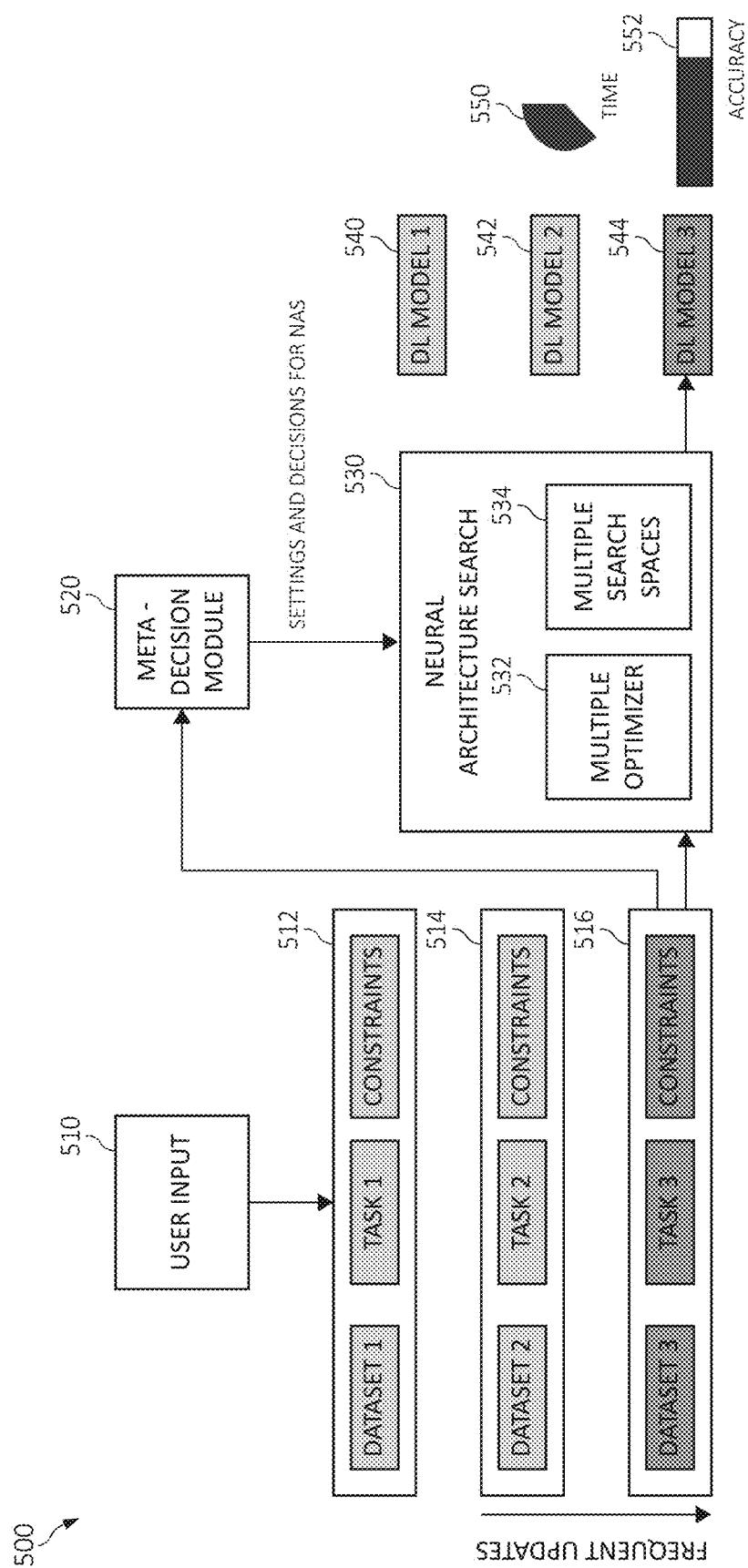
FIGS. 5A-5E are block diagrams depicting exemplary an system and functionality for automating decision making for a neural architecture search in a computing environment by a processor in which aspects of the present invention may be realized.

As depicted in FIG. 5A, starting in block 510, a user may input selected data such as, for example, a dataset, a task, and various constraints such as, for example, input 512 (e.g., data set 1, task 1, constraints), input 514 (e.g., data set 2, task 2, constraints), and input 516 (e.g., data set 3, task 3, constraints), where the input is changing over a period of time. That is, input 512, input 514 and input 516 are changing over a period of time (e.g., frequent updates). In one aspect, the datasets may be a set of images, the tasks may be to label the images, and the constraints may be a selected number of parameters in a deep learning model, a selected/defined time spent in search, and a computational budget for the neural architecture search.

At this point, to provide context to the operations of the present invention, by way of example only, assume that the user provides initially provides input 512 such as, for example, the data set 1, task 1, constraints) without use of the various embodiments of the present invention. Without the decision component 520, the user would be required to directly specify a neural architecture search optimizer and a search space where the neural architecture search component 530 executes a neural architecture search ("NAS") for input 512 to obtain a deep learning ("DL") model such as, for example, DL model 540. The dataset, task, and constraints may be fed into the neural architecture search component 530 by the user. The neural architecture search component 530 outputs a deep learning algorithm (e.g., DL model 540) to help solve the task.

Next, if the user provides a new set of user specifications for dataset, task and constraint such as, for example, input 514 (e.g., data set 2, task 2, constraints), again, without the use of the decision component 520, the user would be required to directly specify a neural architecture search optimizer and a search space using the neural architecture search component 530, and obtain a second deep learning ("DL") model such as, for example, DL model 542. Thus, the neural architecture search needs to be executed from scratch (e.g., a new neural architecture search would be performed without using any previous neural architecture search relating to input 512 data) to obtain a new DL model 542. One reason is because the tradition neural architecture search component is not designed to benefit from previous training experiences. Hence, overall efficiency is extremely reduced and inefficient, both in terms of time spent and accuracy.

Accordingly, as depicted in FIG. 5A, the present invention provides for automating decision making for a neural architecture search by use of the decision component 520. To illustrate in greater detail the operations of the present invention, assume now that a user provides a new set of user specifications for dataset, task and constraint such as, for example, input 516 (e.g., data set 3, task 3, constraints).

Rather than the user specifying a neural architecture search optimizer and a search space, the decision component 520 learns, analyzes, and/or receives the input 516 (e.g., data set 3, task 3, constraints). The decision component 520 feeds the input 516 (e.g., data set 3, task 3, constraints) into the neural architecture search component 530 and provides the neural architecture search component 530 with information/data pertaining to each previous neural architecture search such as, the neural architecture searches, settings, and/or decisions relating to input 512/DL model 540 and input 514/DL 542.

The neural architecture search component 530 using both the information relating to input 516 and the historical data relating to the previous neural architecture searches, settings, and/or decisions relating to input 512/DL model 540 and input 514/DL 542 to improve the efficiency of neural architecture search by making use of previous searches and obtains deep learning model such as, for example, DL model 544. Thus, by employing the operations and components of the present invention, for a given dataset, task, and constraint, the decision component 520 outputs the settings and decisions for a neural architecture search to be performed by the neural architecture search component 530 to obtain a deep learning model such as, for example, DL model 544

Thus, the decision component 520 may suggest/select one or more specifications for a dataset, tasks, and one or more constraints for a neural architecture search to be performed by the neural architecture search component 530. The neural architecture search component 530 may then perform the neural architecture search based on the one or more specifications (which includes the historical neural architecture searches such as, for example, those neural architecture searches for input 512 and input 514. The neural architecture search component 530 may then predict, suggest, and/or provide a configuration for a deep learning model such as, for example DL model 544 for the dataset, the tasks, and the one or more constraints based on the neural architecture search.

In short, as depicted in FIG. 5A, the decision component 520 may, for a given dataset, task, and constraint, output the settings and decisions for the neural architecture search. The neural architecture search component 530 may search a DL model for the dataset, task, and constraint under a configuration specified by the decision component 520 (e.g., using the specifications relating to the dataset, task, and constraint). The neural architecture search component 530, based upon historical data that has been generated and/or learned, may generate, suggest, provide, predict a DL model for the dataset, task, and constraint. Thus, the present invention increases the efficiency of the neural architecture search both in terms of time spent 550 and accuracy 552 of the neural architecture search.

Thus, in one aspect, the decision component 520 may be a machine learning model which receives as input (e.g., input 512, input 514, input 516, etc., or meta-features for a task, dataset, and constraints) a dataset, task, and a set of constraints (both on a desired model and search effort). The decision component 520 may predicts a configuration for the neural architecture search component 530, and subsequently, the neural architecture search component 530 outputs a model for the task.

The decision component 520 may also output a choice or selection of an NAS optimizer from multiple optimizers 532, a choice or selection of a search space from multiple search spaces 534. The decision component 520 may initialize a neural architecture search operation and an option to use one or more previously trained DL models. In one aspect, the multiple optimizer 532 may explores the search space and locates/finds the neural architecture that maximize an objective function of the task for the dataset.

The decision component 520 may, for learning and training, may use one or more learning/training operation such as, for example, using reinforcement learning operations. In one aspect, a reward obtained as the performance of the obtained DL model may be used to update the parameters of decision component 520. It should be noted that, in relation to a "cold start" scenario (e.g., initializing received for the first time without any training/learning such as, for example, input 512), the decision component 520, may use meta features to tackle cold start scenario. Similarly, land markers can be used or a meta-model can be trained on downscaled or training data.

Figure 5B:
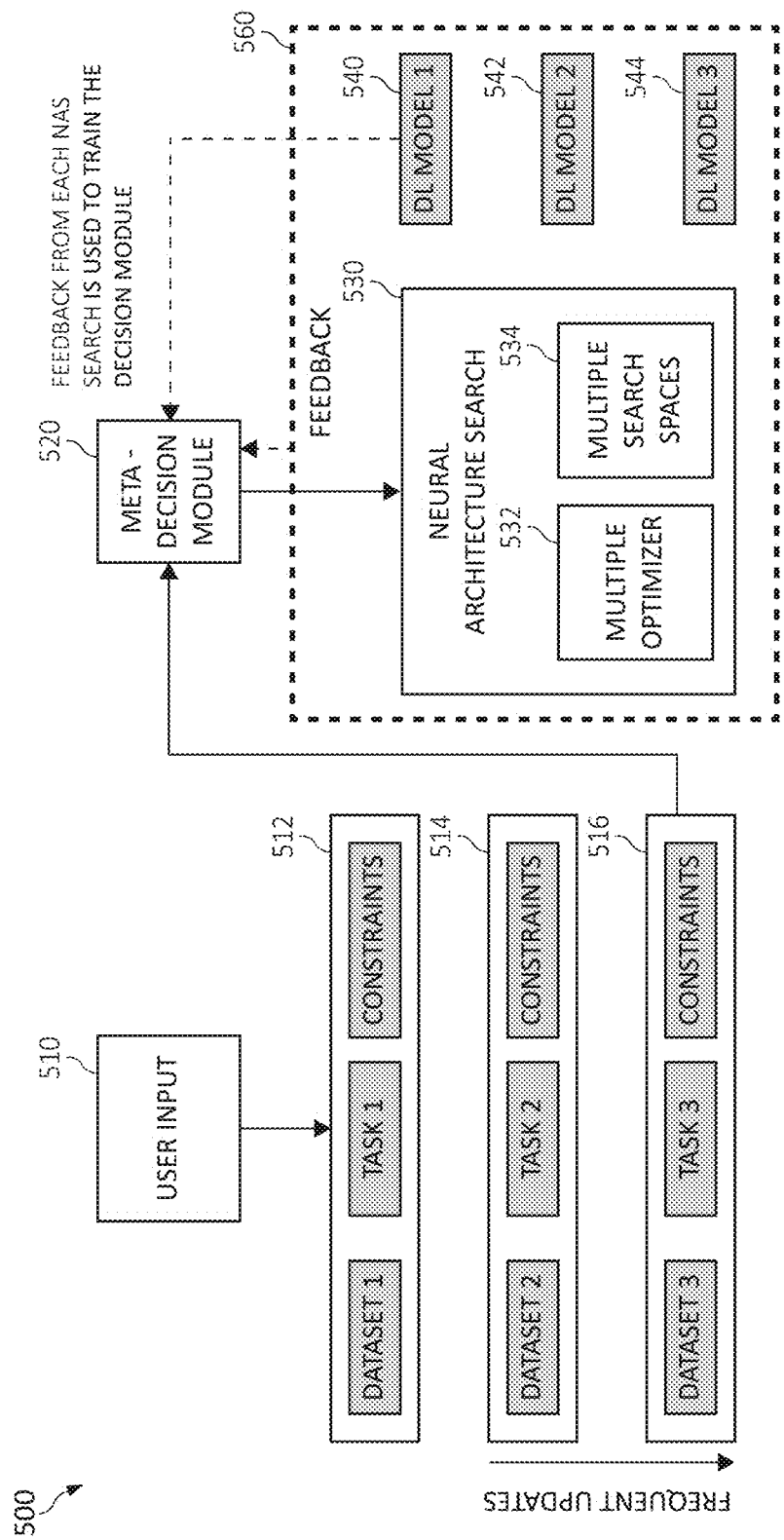

Turning now to FIG. 5B, feedback data 560 may be provided back to the decision component 520 that may be learned using the feedback from each neural architecture search. Thus, the decision component 520 may suggest/select one or more specifications for a dataset, tasks, and one or more constraints for a new neural architecture search to be performed by the neural architecture search component 530 using the feedback data 560 learned from each neural architecture search such as, for example, the neural architecture searches used for obtaining DL model 540 (e.g., DL model 1), DL model 542 (e.g., DL model 2), and DL model 544 (e.g., DL model 3).

Figure 5C:
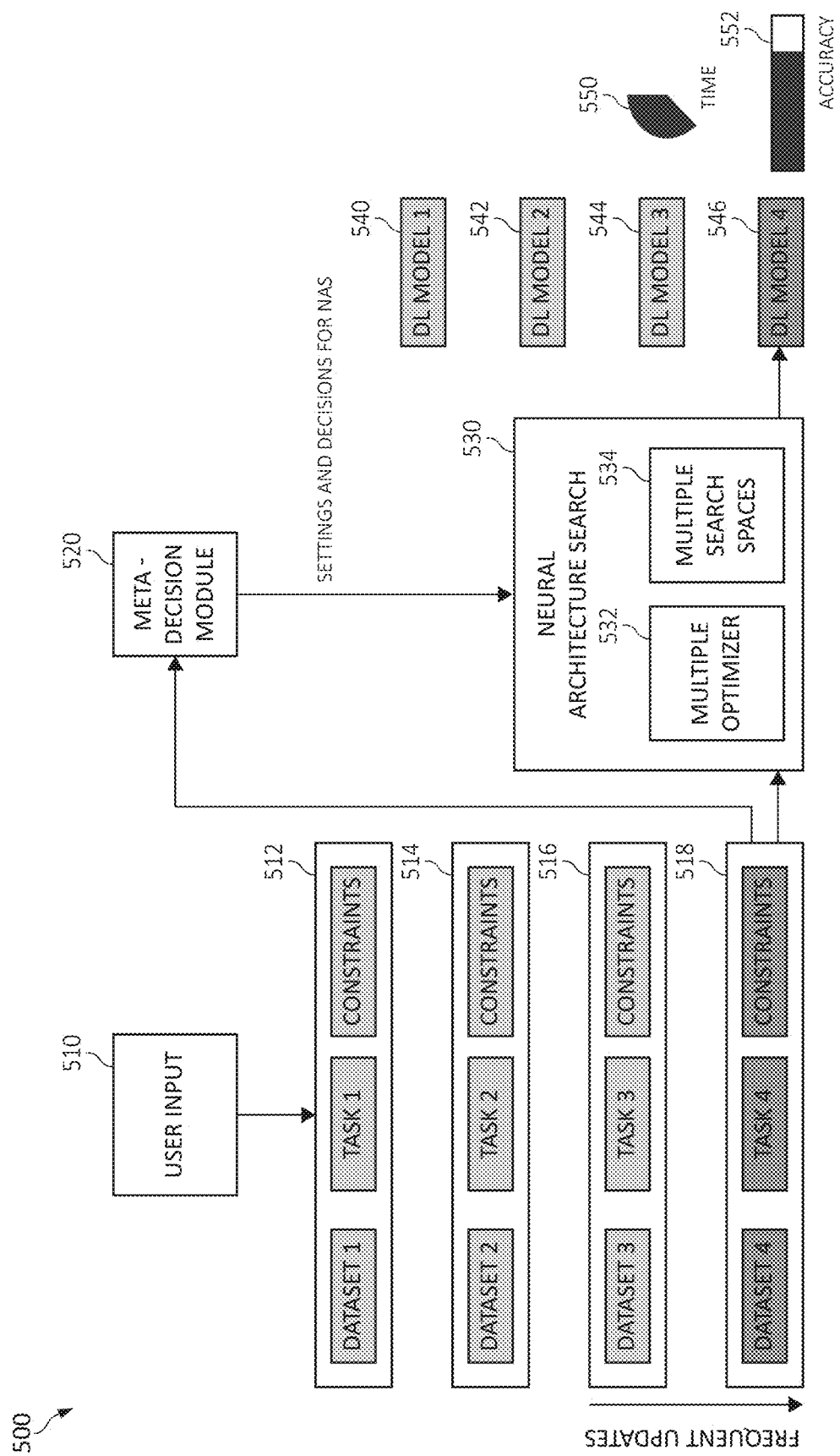

Thus, as illustrated in FIG. 5C, each new neural architecture search benefits from each prior neural architecture search. For example, if the user inputs additional information such as, for example, input 518 (e.g., data set 4, task 4, constraints), the decision component 520 feeds the input 518 (e.g., data set 4, task 4, constraints) into the neural architecture search component 530 and provides the neural architecture search component 530 with information/data pertaining to each previous neural architecture search such as, the neural architecture searches, settings, and/or decisions relating to input 512/DL model 540, input 514/DL 542, input 516/DL model 544 (which is obtained from the feedback data 560), the neural architecture search component 530, based upon historical data that has been generated and/or learned, may generate, suggest, provide, predict DL model 546 (e.g., DL model 4) for the input 518 (e.g., data set 4, task 4, constraints). Again, the NAS settings and decision input into the neural architecture search component 530 by the decision component 520 is used to increase the search time 550 and increase/improve the accuracy of the neural architecture search for DL model 546.

Figure 5D:
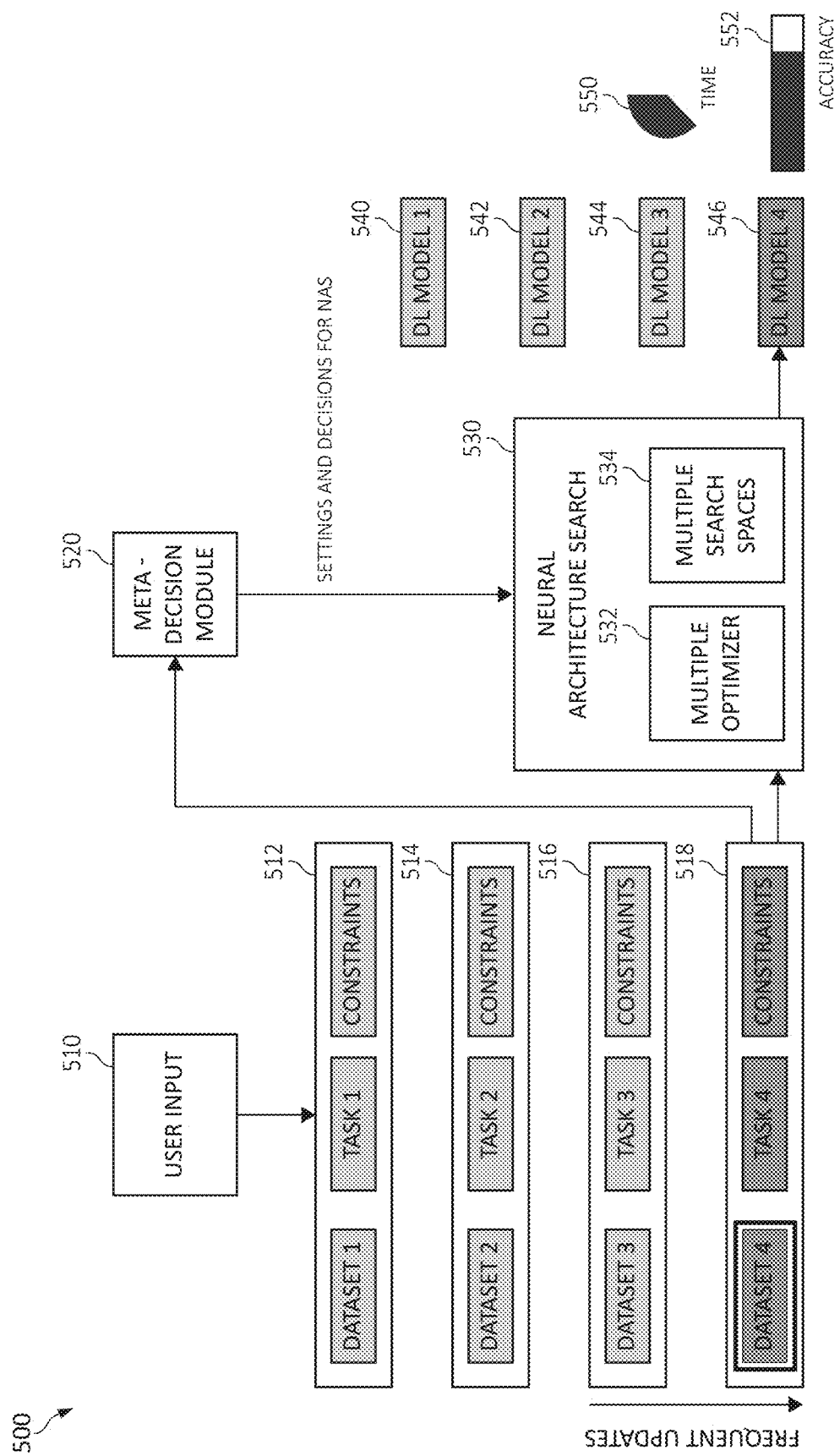

Turning now to FIG. 5D, one or more datasets such as, for example, dataset 4 of input 518, may change during an updated operation such as, for example, transferring across datasets. That is, for transferring across data sets, supervised machine learning models learn to mimic a pattern by observing the pattern multiple times during their training phase. This phase involves the use of labeled data. Two machine learning models that are learned/trained on two different datasets with similar properties tend to be similar in their predictions. Thus, transferring a model trained on one dataset to is used to increase the prediction of another model trained on another dataset.

The decision component 520 may recommend a modification to a previously identified/found DL model and a suitable initialization. That is, in relation to the suitable initialization, a search operation may begin to search by starting at a random initial point followed by a guided exploration of the space as prescribed by the operation. This holds true for learning a machine learning model as well, where model parameters are initially set to some random numbers and them the training steps suitably modifies them. An appropriate initialization would be to save training/search time, which is what the machine learning model decision component as described herein is designed to specify.

Figure 5E:
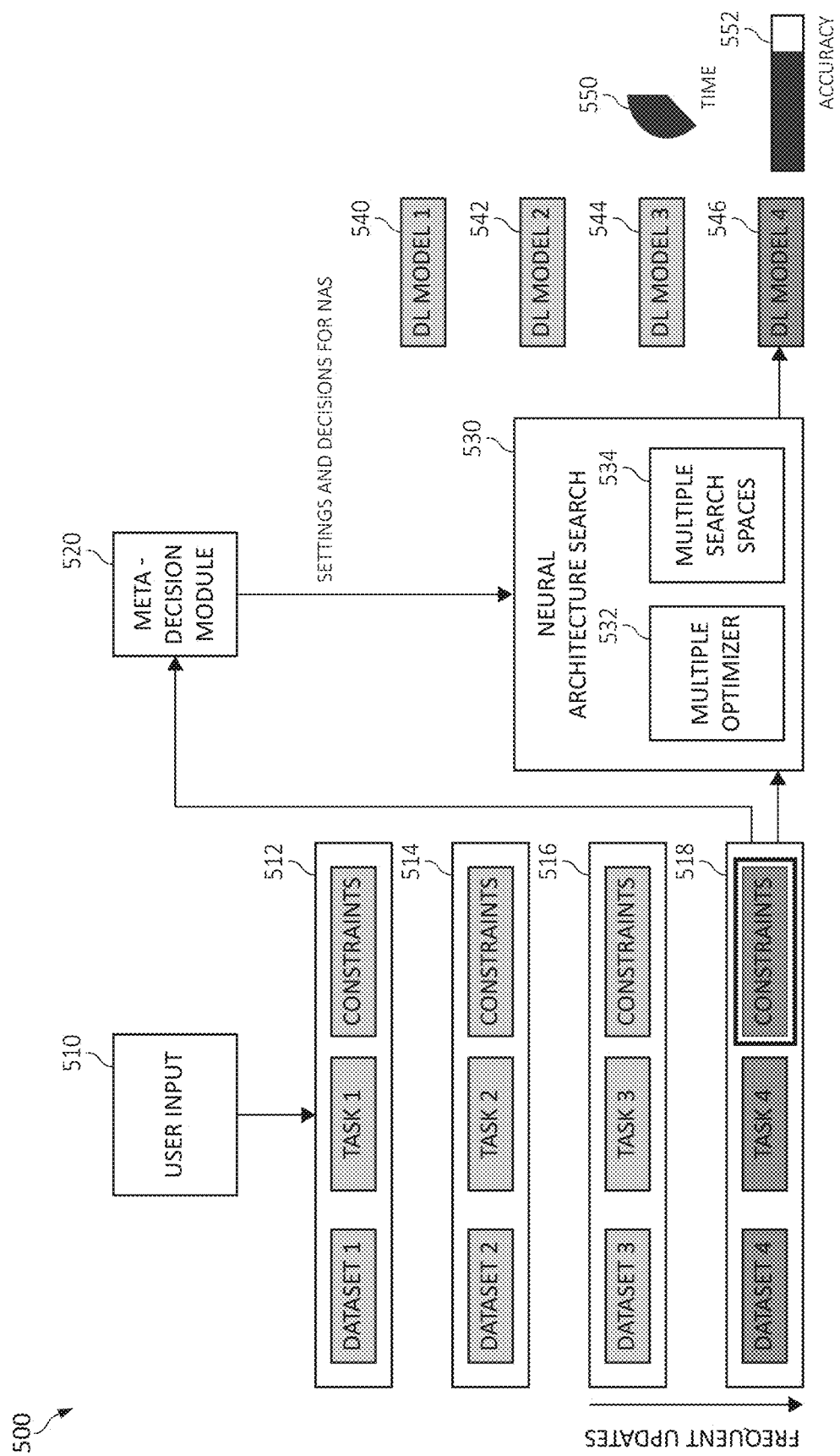

In the event of a constraint changes, as depicted in FIG. 5E, the decision component 520 may recommend a suitable initialization for a new neural architecture search, modified objective function for a new neural architecture search, and/or modify a previously identified/found DL model for a neural architecture search. It should be noted that the constraint may be imposed on a neural architecture search effort (e.g., limiting a number of samples trained during the neural architecture search), and/or upon a selected/desired model (e.g., a selected level of accuracy and a number of parameters).

In view of the various, consider the following examples using one or more mechanisms of the illustrated embodiments.

For example, consider a financial institution/entity where a user is asked to (e.g., the NAS is required) required to identify/find an optimal architecture for a risk-prediction model where the dataset changes (e.g., changes on a daily basis). Without the present invention, a NAS must be executed from scratch with no use of any prior NAS, which is time consuming, and then builds upon model from a previous/earlier time period (e.g., yesterday) with no guarantees on performance. In contrast, the present invention enables a decision component to learn to use the history and/or previous NAS information to identify the optimal neural architecture for a risk-prediction model.

As an additional example, consider the scenario where a financial constraint is imposed for the NAS where a user is asked (e.g., the NAS is required) to identify/find an optimal architecture for a risk-prediction model where the search budget changes (e.g., changes on a daily basis). The financial constraint (e.g., a budget constraint) may specify the amount of time available for search and available computational resources for a particular time period (e.g., a day). Thus, the present invention enables a decision component to learn to use the history and/or previous NAS information to identify and adopt a configuration of NAS based on constraints.

Figure 6:
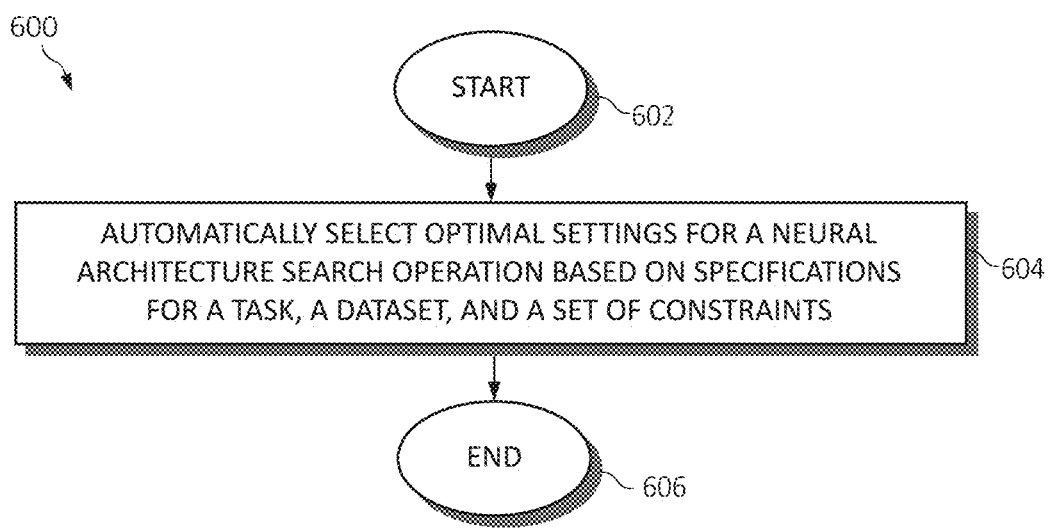
FIG. 6 is a flowchart diagram depicting an exemplary method for automating decision making for a neural architecture search in a computing environment by a processor in which aspects of the present invention may be realized.

Turning now to FIG. 6, a method 600 for automating decision making for a neural architecture search using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

An optimal setting may be selected for a neural architecture search operation based on specifications for a task, a dataset, and a set of constraints, as in block 604. The functionality 600 may end, as in block 606.

Figure 7:
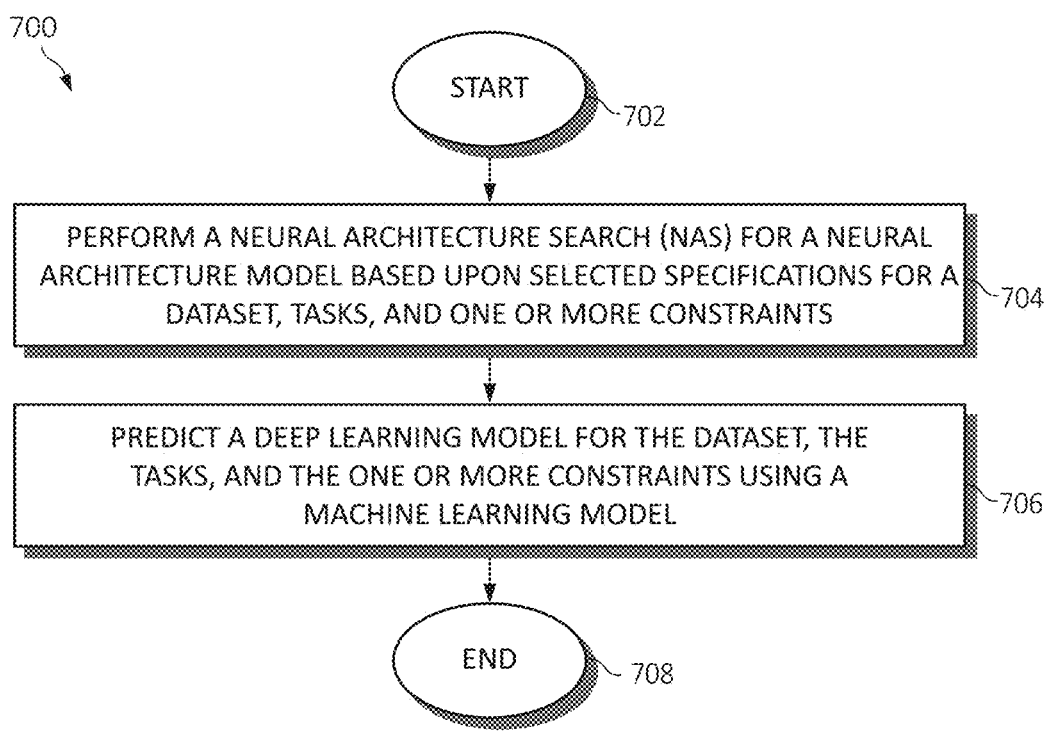
FIG. 7 is a flowchart diagram depicting an exemplary method for automating decision making for a neural architecture search in a computing environment by a processor, again, in which aspects of the present invention may be realized.

Turning now to FIG. 7, an additional method 700 for automating decision making for a neural architecture search using a processor is depicted. The functionality 700 may be implemented as a method executed as instructions on a machine, where the instructions are included on at least one computer readable medium or one non-transitory machine-readable storage medium. The functionality 700 may start in block 702.

Perform a neural architecture search (NAS) for a neural architecture model based upon selected specifications for a dataset, tasks, and one or more constraints, as in block 704. A deep learning model may be predicted (e.g., predicted, suggested, and/or provided) for the dataset, the tasks, and the one or more constraints using a machine learning model, as in block 706. The functionality 700 may end, as in block 708.

In one aspect, in conjunction with and/or as part of at least one blocks of FIGS. 6-7, the operations of 700 and 800 may include each of the following. The operations of 700 and 800 may select one or more specifications for a dataset, tasks, and one or more constraints for a neural architecture search, perform the neural architecture search based on the one or more specifications, suggest a deep learning model for the dataset, the tasks, and the one or more constraints based on the neural architecture search.

The operations of 700 and 800 may learn the one or more specifications from each previous neural architecture search. The operations of 700 and 800 may receive the one or more specifications for the dataset, the tasks, and the one or more constraints, wherein the one or more constraints include at least an allowed neural architecture search time and a permissible number of parameters in a deep learning model.

The operations of 700 and 800 may select a search space and a selected machine learning model by the one or more constraints for the neural architecture search, and/or detect a change to the one or more specifications. In one aspect, the specifications may include dataset dimension(s), dataset type(s), data distribution data, key performance indicators ("KPIs") and metrics, computational resources, a search space for the neural architecture search, or a combination thereof. The operations of 700 and 800 may recommend a modification to a previously identified deep learning model for the neural architecture search.

The operations of 700 and 800 may search a search space to identify the deep learning model that maximizes an objective function of each task for a dataset, or learn one or more decisions and settings relating to previous neural architecture searches for performing the neural architecture search.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for automating decision making for a neural architecture search in a computing environment by one or more processors comprising:
    selecting one or more specifications for a dataset, tasks, and one or more constraints for a neural architecture search;
    performing the neural architecture search based on the one or more specifications;
    suggesting a deep learning model for the dataset, the tasks, and the one or more constraints based on the neural architecture search;
    receiving an additional one or more specifications for the dataset, tasks, and one or more additional constraints for the neural architecture search; and
    automatically outputting a prediction of a neural architecture search optimizer and a search space for performing a subsequent iteration of the neural architecture search to obtain an additional deep learning model to solve the tasks for the dataset based on information obtained from the suggestion of the deep learning model and previous neural architecture search.

2. The method of claim 1, further including learning the one or more specifications from each previous neural architecture search.

3. The method of claim 1, further including receiving the one or more specifications for the dataset, the tasks, and the one or more constraints, wherein the one or more constraints include at least an allowed neural architecture search time and a permissible number of parameters in a deep learning model.

4. The method of claim 1, further including automatically selecting the search space and a selected machine learning model by the one or more constraints for the neural architecture search.

5. The method of claim 1, further including detecting a change to the one or more specifications, wherein the one or more specifications include a dataset dimension, dataset type, data distribution data, key performance indicators ("KPIs") and metrics, computational resources, a search space for the neural architecture search, or a combination thereof.

6. The method of claim 1, further including recommending a modification to a previously identified deep learning model for the neural architecture search.

7. The method of claim 1, further including initiating a machine learning models to:
   searching the search space to identify the deep learning model that maximizes an objective function of each task for a dataset; or
   learning one or more decisions and settings relating to previous neural architecture searches for performing the neural architecture search.

8. A system for automating decision making for a neural architecture search in a computing environment, comprising:
   one or more computers with executable instructions that when executed cause the system to:
      select one or more specifications for a dataset, tasks, and one or more constraints for a neural architecture search;
      perform the neural architecture search based on the one or more specifications;
      suggest a deep learning model for the dataset, the tasks, and the one or more constraints based on the neural architecture search;
      receive an additional one or more specifications for the dataset, tasks, and one or more additional constraints for the neural architecture search; and
      automatically output a prediction of a neural architecture search optimizer and a search space for performing a subsequent iteration of the neural architecture search to obtain an additional deep learning model to solve the tasks for the dataset based on information obtained from the suggestion of the deep learning model and previous neural architecture search.

9. The system of claim 8, wherein the executable instructions when executed cause the system to learn the one or more specifications from each previous neural architecture search.

10. The system of claim 8, wherein the executable instructions when executed cause the system to receive the one or more specifications for the dataset, the tasks, and the one or more constraints, wherein the one or more constraints include at least an allowed neural architecture search time and a permissible number of parameters in a deep learning model.

11. The system of claim 8, wherein the executable instructions when executed cause the system to automatically select the search space and a selected machine learning model by the one or more constraints for the neural architecture search.

12. The system of claim 8, wherein the executable instructions when executed cause the system to detect a change to the one or more specifications, wherein the one or more specifications include a dataset dimension, dataset type, data distribution data, key performance indicators ("KPIs") and metrics, computational resources, a search space for the neural architecture search, or a combination thereof.

13. The system of claim 8, wherein the executable instructions when executed cause the system to recommend a modification to a previously identified deep learning model for the neural architecture search.

14. The system of claim 8, wherein the executable instructions when executed cause the system to initiate a machine learning models to:
   search the search space to identify the deep learning model that maximizes an objective function of each task for a dataset; or
   learn one or more decisions and settings relating to previous neural architecture searches for performing the neural architecture search.

15. A computer program product for, by a processor, automating decision making for a neural architecture search in a computing environment, the computer program product comprising a non-transitory computer-readable storage medium having computer-readable program code portions stored therein, the computer-readable program code portions comprising:
   an executable portion that selects one or more specifications for a dataset, tasks, and one or more constraints for a neural architecture search;
   an executable portion that performs the neural architecture search based on the one or more specifications;
   an executable portion that suggests a deep learning model for the dataset, the tasks, and the one or more constraints based on the neural architecture search;
   an executable portion that receives an additional one or more specifications for the dataset, tasks, and one or more additional constraints for the neural architecture search; and
   an executable portion that automatically outputs a prediction of a neural architecture search optimizer and a search space for performing a subsequent iteration of the neural architecture search to obtain an additional deep learning model to solve the tasks for the dataset based on information obtained from the suggestion of the deep learning model and previous neural architecture search.

16. The computer program product of claim 15, further including an executable portion that learns the one or more specifications from each previous neural architecture search.

17. The computer program product of claim 15, further including an executable portion that:
   receives the one or more specifications for the dataset, the tasks, and the one or more constraints, wherein the one or more constraints include at least an allowed neural architecture search time and a permissible number of parameters in a deep learning model; and
   automatically selects the search space and a selected machine learning model by the one or more constraints for the neural architecture search.

18. The computer program product of claim 15, further including an executable portion that detects a change to the one or more specifications, wherein the one or more specifications include a dataset dimension, dataset type, data distribution data, key performance indicators ("KPIs") and metrics, computational resources, a search space for the neural architecture search, or a combination thereof.

19. The computer program product of claim 15, further including an executable portion that recommends a modification to a previously identified deep learning model for the neural architecture search.

20. The computer program product of claim 15, further including an executable portion that initiates a machine learning models to:
- search the search space to identify the deep learning model that maximizes an objective function of each task for a dataset; or
- learn one or more decisions and settings relating to previous neural architecture searches for performing the neural architecture search.

* * * * *